Dec. 30, 1958 U. BALDÉ 2,866,598

METHOD FOR AUTOMATICALLY READING MARKINGS APPLIED TO CARRIERS

Filed Sept. 21, 1954 3 Sheets-Sheet 1

Dec. 30, 1958 U. BALDÉ 2,866,598

METHOD FOR AUTOMATICALLY READING MARKINGS APPLIED TO CARRIERS

Filed Sept. 21, 1954 3 Sheets-Sheet 2

METHOD FOR AUTOMATICALLY READING MARKINGS APPLIED TO CARRIERS

Filed Sept. 21, 1954 3 Sheets-Sheet 3

United States Patent Office 2,866,598

Patented Dec. 30, 1958

2,866,598

METHOD FOR AUTOMATICALLY READING MARKINGS APPLIED TO CARRIERS

Ulysse Baldé, Zurich, Switzerland, assignor to Mithra A.-G., Zurich, Switzerland Application September 21, 1954, Serial No. 457,457

18 Claims. (Cl. 235—61.11)

Figure 1:
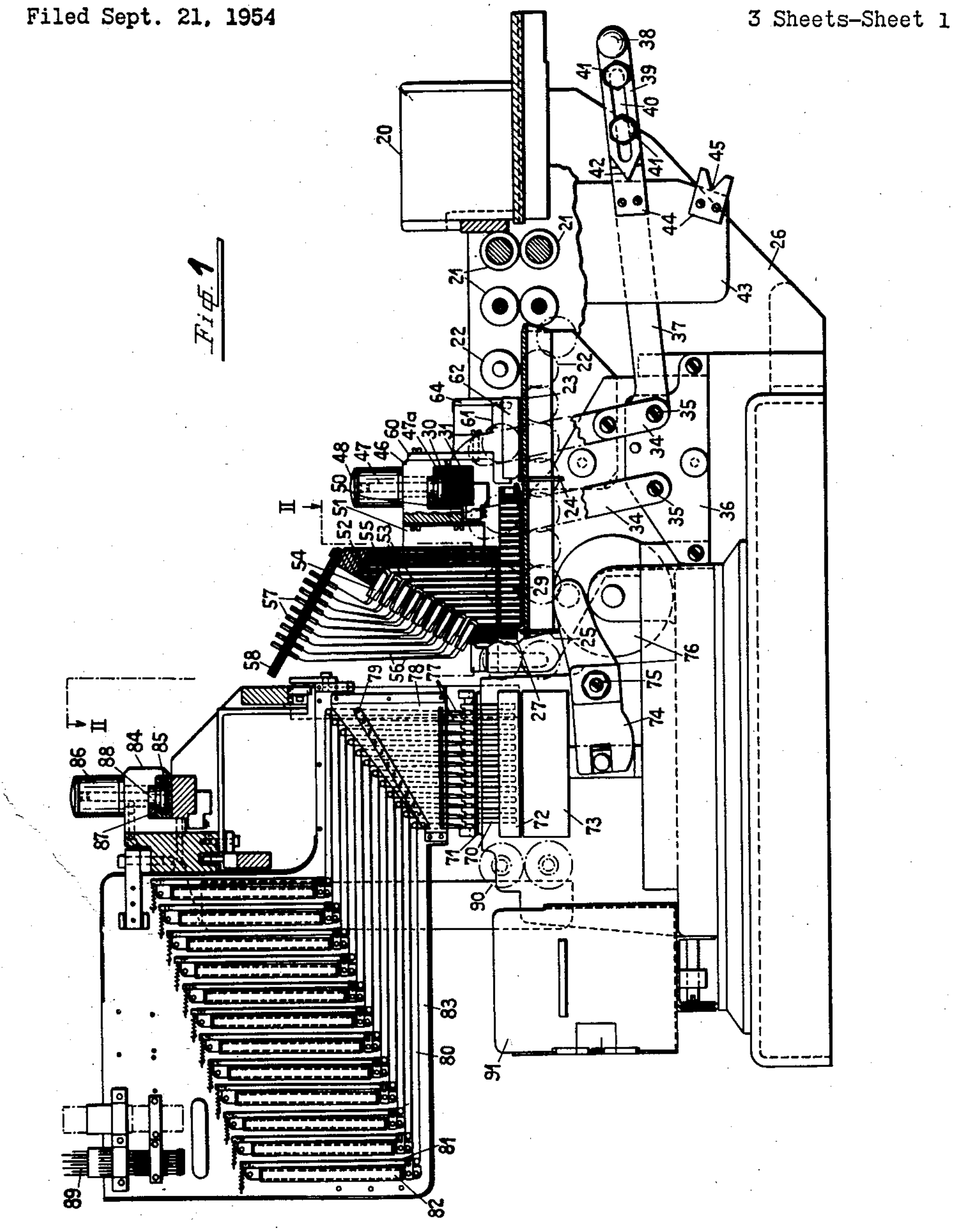

Automatic calculating and book-keeping machines are known in which the values to be manipulated are communicated with the aid of cards or tapes (herein referred to as carriers), the values being retained on the latter by perforations, magnetism or by other means.

Furthermore, various methods have been proposed to apply or put down these values manually, for example with the aid of a pencil or the like, and not by perforations, on the carriers, and yet subsequently have them evaluated automatically through the machines. Thus, for example, markings or records in form of dashes of graphite or a similar material may be applied to a card at various points according to a predetermined code. Reading these markings may be effected, for example, by using electrical conductors for closing circuits, or the cards with the markings may be illuminated and the light rays having been altered by the higher opacity of the markings, may be caused to act on photo-electric cells. The manually-applied marking dashes also have been used as reflector elements to reflect the light emitted from a suitably arranged source of light, into associated photo-electric cells.

My present invention relates to another method for automatically reading markings which have been manually applied to carriers, and to an arrangement for carrying out such method. A prerequisite is that the markings are disposed according to a predetermined code on various points of the carriers and consist of an electrically-conductive material, whilst the carriers consist of an electrically and thermally non-conductive material.

In the method disclosed by my present invention, a high-frequency electromagnetic field is caused to act on the marked carrier so as to give origin to a rise in temperature relatively to the ambient temperature, whereupon the points of the markings are ascertained with the aid of heat radiation detectors which bias electrical circuits for recording and evaluating the results.

The arrangement disclosed herein for carrying out such method is characterized by means for producing a high-frequency electro-magnetic field, a plurality of heat radiation detectors which are screened relatively to each other and which are connected to electrical circuits for recording and evaluating the results, and by means for transporting the marked carriers first into the range of the high frequency field and then into the range of the radiation detectors.

Each radiation detector suitably comprises a temperature-responsive resistance which serves for controlling an electric current. Immediately after having ascertained the electrically-conductive record markings, the carriers may be advanced to a marking device where they are provided with markings of a different kind, such as perforations, in dependency on the ascertained results. The last-mentioned markings may be applied to the point bearing the respective electrically-conductive markings, or to other points of the carrier.

The means to further perform the evaluation of the sensed data are well known to those skilled in the art, and are therefore not specified in this specification.

The method of the invention has the great advantage that dirt, such as produced by greasy fingers or other, does not affect accuracy of the reading, while it alters strongly the opacity or transparency of the cards and therefore sensing with light gives wrong results. The frequency of the high frequency field may be about 1 megacycle per second.

Figure 2:
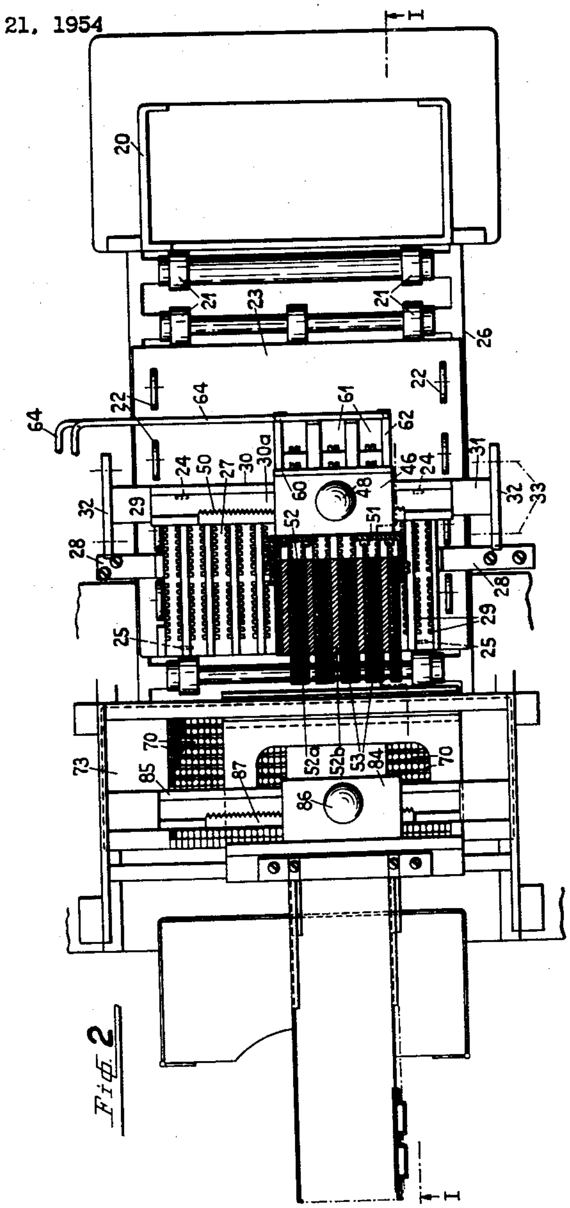
Figure 3:
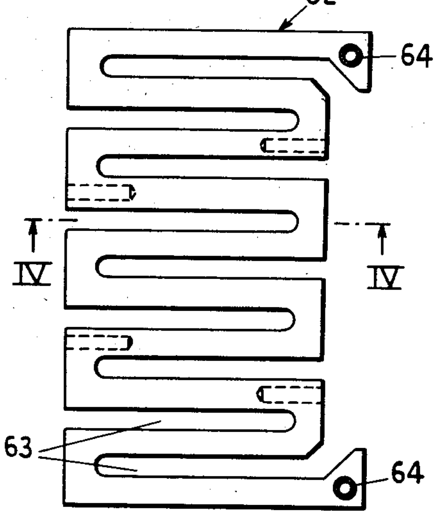
Figure 4:
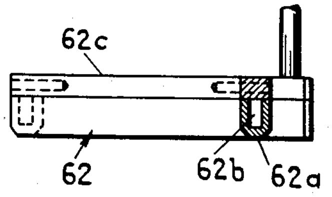
Figure 5:
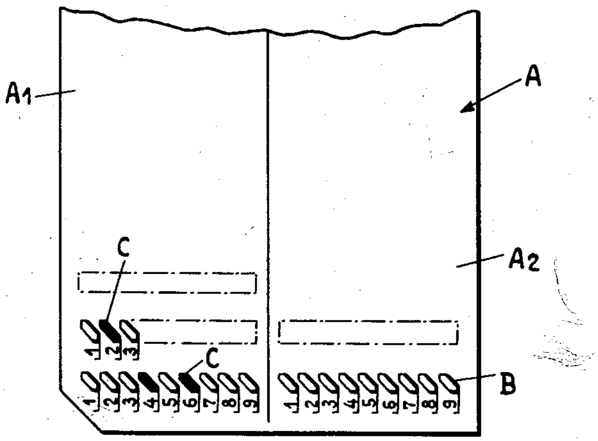

One form of my present invention is shown, by way of example, in the accompanying drawings, in which:

Fig. 1 illustrates a device for automatically reading markings manually-applied to carriers, and for subsequently perforating the latter, partly in side view and partly in vertical section on the line I—I of Fig. 2, Fig. 2 is a top plan view of said device, partly in horizontal section on the line II—II of Fig. 1, Fig. 3 is a top plan view of the conductor for producing the high-frequency field, on a larger scale than Fig. 2, Fig. 4 depicts a cross-section on the line IV—IV of Fig. 3, and Fig. 5 shows a portion of a carrier in the position corresponding to Fig. 2, but on a larger scale than the latter.

In Figs. 1 and 2, the numeral 20 designates a box in which may be stacked the cards bearing the manually applied markings or records which have to be read. The box 20 is disposed at the beginning of a conveyor for the carriers. The conveyor comprises a plurality of pairs of co-acting feed rolls 21 and 22 of which the lower ones are gear driven, whilst the upper ones are formed as resiliently mounted engagement or contact rolls. A horizontal plate 23 made of insulating material, forms a slide for the cards and comprises a plurality of cut-outs through which the lower feed rolls 22 partly project upwardly to seize and feed the cards lying on the plate. The plate 23 further is provided with openings through which project dogs 24 and 25 from the plate underside. The dogs 24, 25 are formed as vertically movable sliders and communicate with a driving mechanism (not shown) which is disposed below the plate 23 and preferably comprises an electromagnet as driving means. The dogs 24, 25 serve to retain the cards fed by the rolls 21, 22 in two definite positions when the dogs project through the plate 23. When, however, the dogs are retracted by the said mechanism, the cards may freely pass over the dogs. The box 20 and plate 23 are secured to a frame 26 on which are rotatably mounted the rolls 21 and 22.

Intermediate of the dogs 24, 25 is disposed a slider 27 at some distance above plate 23. The slider 27 is made of insulating material and is movable on frame 26 through a relatively small distance at right angles to the direction of movement of the cards, i. e. at right angles to the plane of Fig. 1. The slider is substantially of the size of a single card and on both of its short sides is provided with guide rods 28 of which one communicates with the drive mechanism (not shown) which preferably comprises an electromagnet. In the slider 27 are provided a plurality of openings 29 arranged in rows of which each comprises twice nine openings. Any other number of openings, however, could be provided of course. Fig. 2 shows that the slider is composed of a plurality of strips of which some at their contact faces with the adjacent strips comprise notches which form the openings 29. The slider 27 may occupy two definite sliding positions in one of which the openings 29 are situated above those card points which are provided with markings to be read, and in the other position the slider 27 covers these card points. The slider 27 thus serves as orifice plate or diaphragm.

A metallic rail 30 runs across the conveyor and has a continuous longitudinal groove 30*a* provided with undercut flanks. The rail 30 is secured to a beam 31 made of insulating material, and at each of its two ends carries a cross-beam 32. To the latter are articulated, at 33, the upper ends of links 34 which are disposed in parallel relationship. The lower ends of the links 34 are pivoted on pins 35 (Fig. 1) to plates 36 which in turn are secured to the frame 26. For the sake of clarity, the links 34 and plates 36 are not shown in Fig. 2.

The rail 30 by means of the links 34 may be moved parallel to itself in the direction of card feed. One of the links 34 is rigidly secured to one arm of a bell-crank 37 of which the other arm at its free end carries a handle 38. The latter is attached to a slide member 39 which by means of a longitudinal slot 40 and two screws 41 is movably mounted on the bell-crank 37 and has a tapered end 42. On a guide plate 43 which through spacers is secured to frame 26, are disposed two blocks 44 having each a tapered notch 45 into which may be inserted the end 42 in order to locate the bell-crank 37 in position. A spring (not shown) pulls the slide member 39 to the left in Fig. 1.

A carriage 46 is movably guided on the rail 30 and beam 31, and comprises a rotatably mounted vertical pin 47 which has a portion 47*a* engaged in the groove 30*a* and on top carries a knob 48. To pin 47 is connected a pinion which meshes with a rack 50 secured to rail 30. By turning the knob 48, the carriage 46 may be moved on rail 30. To carriage 46 is secured an insulating block 52 by means of angles 51, which block in both positions of bell-crank 37 depends to within a short distance from the upper side of the slider 27 which serves as orifice plate or diaphragm.

The insulating block 52 is provided with a plurality of linear conduits 53 running substantially at right angles to plate 23. The relative arrangement of the conduits 53 corresponds to that of the openings 29 in slider 27, although the number of ducts 53 is smaller than that of openings 29. The mouths of the conduits 53 situated immediately above the slider 27, in both positions of bell-crank 37 agree with a portion of the openings 29 when the slider 27 is in one sliding position. The block 52 further comprises a number of heat radiation detectors 54 corresponding to the number of conduits 53, which detectors are disposed at the upper ends of the conduits 53. The detectors 54 comprise an evacuated glass vessel in which is housed an electrical temperature-responsive resistor 55 disposed on the extended longitudinal axis of the associated conduit 53. Such radiation detectors are commercial elements known as thermistors, and the resistor 55 is composed of a mixture of various metallic oxides and has a comparatively high negative temperature coefficient. Each resistor 55 through two electrical conductors 56 is connected to terminals 57 which are disposed on an insulating plate 58.

The insulating block 52 is composed of a plurality of plate-like elements 52*a* and 52*b*. In the elements 52*a* are milled grooves which form the conduits 53 and seats for the detectors 54. The other elements 52*b* consist of an elastically yieldable rubber-like material, e. g. of sponge rubber, and are disposed between two of the other elements 52*a*. For this reason, one face of the recesses which serve as seats for the detectors 54, is elastically yieldable. The detector glass vessels are inserted into the corresponding seat recesses under compression of the yieldable plates 52*b* and, thus, clamped by reason of the elasticity of these plates. As shown in Fig. 2, there are provided altogether 81 conduits 53 and detectors 54 which are arranged in nine rows at nine pieces each.

Three holders 61 made of insulating material are secured to the carriage 46 by means of a vertical supporting plate 60. The holders 61 carry an inductor 62 in form of a meandering electrical conductor which runs curvedly in a plane parallel to plate 23 (Figs. 1, 3 and 4). In both positions of bell-crank 37, the inductor 62 is situated at some distance above plate 23 so that the cards may pass between these elements. The construction of inductor 62 is more clearly visible from Figs. 3 and 4. The inductor forming conductor is hollow to allow to pass a coolant therethrough. The inductor may be made, for example, by milling a meandering groove 62*b* in a copper plate 62*a* and then soldering a second copper plate 62*c* to the first plate above the open groove thereof. Finally, slots 63 are milled in both plates 62*a*, 62*c* as shown in Fig. 3, so that the groove 62*b* nowhere lies open. The slots 63 are coplanar with said rows of conduits 63. Thus, there also are nine slots 63.

The inductor 62 is connected to two copper tubes 64 which serve for feeding and discharging the said coolant as well as for supplying the induced current which is a high-frequency alternating current, of which the frequency may be one magacycle for example. The field covered by the inductor 62 is at least of the same size as the field covered by the conduits 53.

From the foregoing it is evident that the carriage 46 serves as common support for the radiation detectors and the inductor. These members thus are movable only together and to the same amount by moving the carriage 46 and setting the bell-crank 37.

The mode of use and of operation of the parts described so far, is as follows:

Cards A which may be formed as shown in Fig. 5, are introduced into the box 20. In Fig. 5, the card A is subdivided into two half portions $A_1$ and $A_2$, in which are provided a plurality of rows of bordered areas B. Each row contains nine areas B which are designated by the ordinal numbers 1 to 9. The latter as well as the borders of the areas B preferably are printed on the card. The center-to-center distance of the rows of areas B is equal to that of the inductor slots 63, and the center-to-center distance of the areas B within each row is equal to that of the conduits 53 of each conduit row. The cards A consist of electrically and thermally insulating material such as cardboard. The cards are provided with manually applied markings C which consist of electrically conducting material and may be applied, for example, by means of a graphite pencil to any of the areas B.

The cards, by means of the rolls 21 and 22, are fed one by one (to the left in Figs. 1 and 2) from the box 20 on to the insulating plate 23, being stopped by the dogs 24. The carriage 46 previously has been so adjusted by means of knob 48 that the rows of areas B (which have to be read) now are situated below the slots 63 of inductor 62. When the bell-crank 37 occupies the position shown in Fig. 1, the card field $A_1$ is situated within the range of the inductor when the cards abut against the dogs 24. The high-frequency alternating current flowing through the inductor 62 produces in the slots 63 and in the surroundings thereof a high-frequency electromagnetic field in the range of which are situated the markings C of a card A. Through the action of eddy currents, the electrically conducting markings C are raised in temperature by, for example, 30° C. above the ambient temperature, whilst the temperature of the card material is practically not raised when the frequency used is of the order of one megacycle.

After a predetermined period sufficient for obtaining the desired warming, the dogs 24 are automatically withdrawn and the card with said markings C is fed underneath the slider 27 until it abuts against the dogs 25. During such movement of the card, the slider 27 is in such a position that it screens the markings from above so that no heat radiation reaches the detectors 54. Only when the card is stopped in the predetermined position, the slider is automatically moved so that its openings 29 register with the mouths of the conduit 53. The previously warmed markings C now radiate part of their heat to the detectors 54 disposed thereabove, thus decreasing their resistance value. Electric currents flowing through these resistors thereby are raised in intensity, whilst the currents flowing through the other detectors which are not subjected to heat radiation, are not altered. From these changes, the read results may be ascertained and, if desired, evaluated, as will be explained later. After a certain period of time, the dogs 25 are automatically withdrawn, whereupon the read card will be ejected from the conveyor.

The dogs 24, 25 practically operate simultaneously, and at the same time the markings C of a card are warmed up and the previously warmed markings of a second card are read.

When the bell-crank 37 is swung over into the other position, the other field $A_2$ of the cards is situated in the range of the inductor 62 or detectors 54 respectively when the card abuts against the dogs 24 and 25. By adjusting the knob 48 accordingly, any desired rows of marking areas C may be read.

The apparatus shown in Figs. 1 and 2 comprises at the conveyor end a perforating device through which pass the read cards. The perforating device comprises a plurality of punches 70 disposed in rows which are mounted axially movable vertically in two plates 71 and 72. The upper plate 71 is rigidly secured to the frame 26, whilst the other plate 72 is vertically movable. A block 73 is disposed at some distance below the plate 72 so that the cards may be moved therebetween. The block 73 is provided with recesses into which the punches 70 can penetrate in the perforating operation. The plate 72 and block 73 together are movable upwardly and downwardly by means of a two-arm lever 74. The latter is pivoted on an axle 75 to the frame 26 and is operatively connected to a rotary control disc 76 which serves as drive for the members 72 and 73.

Above the punches 70, pawls 77 are pivotably mounted at 79 between sheets 78. Such a pawl 77 is associated with each punch of a row, which depending on its position either prevents the punches from moving upwardly or not. Each pawl 77 through a link 80 is connected to the armature 81 of an associated electromagnet 82. The magnets 82 belonging to a row of punches 70 are secured to a vertical plate 83. The number of rows of pawls 77 is smaller than the number of punches 70. All the pawls 77 and their associated electromagnets 82, however, are disposed on a carriage 84, which, similarly to the carriage 46, is movable on a rail 85 at right angles to the direction of card transport, so that all the punches 70 are controllable, but not all of them at one and the same time. The carriage 84, here also, is set by means of a knob 86 which drives a pinion 88 co-acting with a rack 87. The electromagnets by means of electrical conductors (not shown) are connected to lead-out wires which in turn are connected to electric control means (not shown).

To the rear of the perforating device described, there are again conveyor rolls 90 and, furthermore, a receiver box 91 for the perforated cards.

Control means (not shown) ensure a synchronous operation of the various movable elements of the system.

When a read card arrives in the perforating device, it is stopped in a predetermined position by stops (not shown) between the plate 72 and the block 73. Part of the magnets 82 are excited depending on the results read previously from the same card. The pawls 77 connected to these magnets thereby are swung through such an angle that they prevent the subjacent punches 70 from moving upwardly. The control disc 76 by means of lever 74 imparts an upward movement to the block 73 and the plate 72, the card being taken along. All those punches 70 which are not locked by a pawl 77, then also move upwardly, together with the card, without punching the latter. Those punches 70, however, which are prevented from moving upwardly, pierce the card, and the latter is perforated. In this manner, the markings C which have been manually applied to the cards, can automatically be converted to perforations which subsequently may be further evaluated in known punched-card machines.

Since the pawls 77 by means of the knob 86 may be moved above the punches 70 to various points, it is possible to produce the perforations in any desired rows of the cards. Since the two knobs 48 and 86 can be set independently of each other, the perforations may be applied alternatively to the points of the manually applied markings or to other points. According to the electric control means used, which are inserted between the terminals 57 and the lead-out wires 89, it also is possible to mark, by means of the perforating device, results of calculations which depend on data given through the manually applied markings.

Obviously, the system may be so constructed that the entire cards may be read and perforated all at one and the same time. This may be done by correspondingly increasing the number of detectors 54 and pawls 77 and the size of the inductor.

The system may be adapted for the use of tapes, instead of cards, which serve as carriers for the markings. When the carriers are provided with a magnetizable coating or layer, the additional marking device also may be so constructed that it applies the markings in the form of magnetisation to the carriers.

While I have herein described and illustrated in the accompanying drawings what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. An arrangement for automatically reading markings applied to a carrier consisting of electrically and thermally insulating material, markings on the said carrier consisting of electrically conductive material, comprising in combination: means for producing a high frequency electromagnetic field on the said markings, a plurality of heat radiation detectors screened from one another and exposed to the heat radiation given off by the said markings under the action of the said high frequency field, electrical circuits connected to the said heat radiation detectors and including means conveying the said carrier firstly into the range of the said means producing a high frequency field and then into the range of the said heat radiation detectors.

2. An arrangement as claimed in claim 1, in which each of the said heat radiation detectors comprises a temperature responsive resistor controlling one of the said electric circuits.

3. An arrangement as claimed in claim 2, comprising in addition: a carrier track, an insulating block in which the said heat radiation detectors are accommodated and having a plurality of conduits each of which leads to the said carrier track in a straight path substantially at right angles to the said carrier track.

4. An arrangement as claimed in claim 3, in which the mouths of the said conduits are disposed relative to each other in the same manner as the points at which the said markings may be present on the said carrier.

5. An arrangement as claimed in claim 3, in which the said heat radiation detectors comprise evacuated glass vessels each containing one of the said resistors, and wherein the said insulating block comprises elastically yieldable parts retaining the said heat radiation detectors.

6. An arrangement as claimed in claim 5, in which the said elastically yieldable parts of the said insulating block consist of rubber-like plates each of which is disposed between two rows of the said heat radiation detectors.

7. An arrangement for automatically reading markings applied to carriers consisting of electrically and thermally insulating material, markings on the said carriers consisting of electrically conductive material, comprising in combination: electromagnetic means generating a high frequency field on the said markings, a plurality of heat radiation detectors arranged in rows and exposed to the heat radiation given off by the said markings under the action of the said high frequency field, electrical circuits connected to the said heat radiation detectors and including means conveying the said carriers firstly into the range of the said electromagnetic means generating the high frequency field and then into the range of the said heat radiation detectors, a carrier track, an automatically controlled orifice plate inserted between the said radiation detectors and the said carrier track screening the said detectors for the said carriers during the movement of the latter, and means permanently screening the said heat radiation detectors from one another.

8. An arrangement as claimed in claim 7, in which the said orifice plate consists of insulating material and is reciprocable, having one end position in which its orifices register with the points at which the said electrically conductive markings may be present on the said carriers, and another end position in which its orifices are offset from the said points.

9. An arrangement as claimed in claim 7, wherein the said orifice plate is arranged reciprocable at right angles to the said carrier track.

10. An arrangement for automatically reading markings applied to carriers consisting of electrically and thermally insulating material, markings arranged in rows on the said carriers, consisting of electrically conductive material, comprising in combination: electromagnetic means generating a high frequency field on the said markings, comprising a conductor curved meander-like in a plane, a plurality of heat radiation detectors arranged in rows corresponding to those of the said markings, screened from one another and exposed to the heat radiation given off by the said markings under the action of the said high frequency field, electrical circuits connected to the said heat radiation detectors and including a carrier track, conveying means moving the said carriers firstly through the range of the said electromagnetic means generating the high frequency field and then into the range of the said heat radiation detectors, the said conveyer means moving the said carriers below the said meander-like conductor, the latter being always kept in juxtaposition with the intervals between the said rows of markings, and an automatically controlled orifice plate inserted between the said radiation detectors and the said carrier track screening the said radiation detectors from the said carriers during the movement of the latter.

11. An arrangement as claimed in claim 10, in which the said conductor is hollow and has fluid connection means passing a coolant through it in operation.

12. An arrangement as claimed in claim 10, comprising in addition a common support on which the said radiation detectors and conductors producing the high frequency field are disposed, and operating means moving the said common support relative to the said carrier track in such a manner that different marking fields on the said carriers may be read.

13. An arrangement as claimed in claim 12, wherein the said orifice plate is large enough to cover the range through which the said support is moved for reading different marking fields, so that the said orifice plate may remain in an unchanged position when moving the said support from one field of markings to another.

14. An arrangement as claimed in claim 12, comprising in addition a rail movable in the direction of the said carrier track, the said common support being a carriage movable at right angles to the said carrier track and being guided by the said rail.

15. An arrangement for automatically reading markings applied to carriers consisting of electrically and thermally insulating material, markings on the said carriers consisting of electrically conductive material, comprising in combination: electromagnetic means generating a high frequency field on the said markings, a plurality of heat radiation detectors arranged in rows, screened from one another and exposed to the heat radiation given off by the said markings under the action of the said high frequency field, electrical circuits connected to the said heat radiation detectors and including means conveying the said carriers firstly into the range of the said electromagnetic means generating the high frequency field and then into the range of the said heat radiation detectors, and automatically controlled dogs retaining the said carriers in predetermined positions in the range of the said high frequency field and of the said heat radiation detectors, and releasing the same after a predetermined period of time.

16. An arrangement as claimed in claim 15, comprising in addition a rail, links supporting the said rail so that the latter is moveable parallel to itself, a common support carrying the said heat radiation detectors and generating means of the high frequency field, guided on the said rail, and operating means moving the said common support at right angles to the said carrier conveying means, the said rail being so moveable that two separate fields of the said markings on the said carriers are alternatively readable.

17. An arrangement as claimed in claim 16, for the use with carriers wherein the said markings are arranged in two fields on the upper and lower half of a carrier, respectively, and wherein the said carriers are moved by the said rail into two alternative positions in which the said carriers abut on the said dogs, when the markings on the said upper half, and the markings on the said lower half of the said carriers are readable, respectively.

18. An arrangement as claimed in claim 1, comprising in addition means for cooling the electric means generating the said high frequency field.

References Cited in the file of this patent

UNITED STATES PATENTS

| | | |
|---|---|---|
| 2,007,391 | Bryce | July 9, 1935 |
| 2,319,174 | Wilson | May 11, 1943 |
| 2,444,067 | Shann | June 29, 1948 |
| 2,508,953 | Knutsen | May 23, 1950 |
| 2,547,838 | Russell | Apr. 3, 1951 |